United States Patent
Ryskamp et al.

(10) Patent No.: US 12,438,929 B2
(45) Date of Patent: Oct. 7, 2025

(54) LIMITING PERCEPTION LEVELS OF MEDIA EXCHANGES WITHIN MULTI-USER VIRTUAL SUB-SPACES

(71) Applicant: Zoom Communications, Inc., San Jose, CA (US)

(72) Inventors: Robert Allen Ryskamp, Mountain View, CA (US); Adam Justin Spooner, Greensboro, NC (US); Aleksandra Swerdlow, Santa Clara, CA (US)

(73) Assignee: Zoom Communications, Inc., San Jose, CA (US)

( * ) Notice: Subject to any disclaimer, the term of this patent is extended or adjusted under 35 U.S.C. 154(b) by 196 days.

(21) Appl. No.: 17/946,279

(22) Filed: Sep. 16, 2022

(65) Prior Publication Data
US 2024/0095681 A1    Mar. 21, 2024

(51) Int. Cl.
*H04L 65/401* (2022.01)
*G06Q 10/1093* (2023.01)
*H04L 65/403* (2022.01)

(52) U.S. Cl.
CPC ..... *H04L 65/4015* (2013.01); *G06Q 10/1095* (2013.01); *H04L 65/403* (2013.01)

(58) Field of Classification Search
CPC ............ G06Q 10/1095; H04L 65/4015; H04L 65/403
See application file for complete search history.

(56) References Cited

U.S. PATENT DOCUMENTS

| | | | |
|---|---|---|---|
| 7,149,298 B2 | 12/2006 | Fernandes et al. | |
| 10,873,611 B2 | 12/2020 | Zlatarev | |
| 11,321,643 B1* | 5/2022 | Poel | G06F 3/04842 |
| 11,362,848 B1 | 6/2022 | Lin et al. | |
| 2007/0208806 A1 | 9/2007 | Mordecai et al. | |
| 2012/0017149 A1* | 1/2012 | Lai | H04L 65/403 |
| | | | 715/758 |
| 2013/0120371 A1 | 5/2013 | Petit | |
| 2022/0014712 A1 | 1/2022 | Cordourier Maruri et al. | |
| 2022/0067666 A1 | 3/2022 | Shiner | |
| 2022/0271962 A1* | 8/2022 | Patel | G06F 3/167 |
| 2022/0279073 A1* | 9/2022 | Li | H04M 3/565 |

OTHER PUBLICATIONS

Steuernagel, A Graphical User Interface for Multiparty Videoconferencing, Master's Thesis, FernUniversität in Hagen, Germany (2007) (Year: 2007).*

* cited by examiner

*Primary Examiner* — Charles Guiliano
(74) *Attorney, Agent, or Firm* — Young Basile Hanlon & MacFarlane, P.C.

(57) ABSTRACT

A connection of users to a multi-user virtual space is detected. A multi-user virtual sub-space within the multi-user virtual space is formed. A group of users from among the users are assigned to the multi-user virtual sub-space. Media exchanges are focused for the group of users within the multi-user virtual sub-space by limiting a perception level of media exchanges between users not assigned to the multi-user virtual sub-space relative to users assigned to the multi-user virtual sub-space.

20 Claims, 9 Drawing Sheets

LIMITING PERCEPTION LEVELS OF MEDIA EXCHANGES WITHIN MULTI-USER VIRTUAL SUB-SPACES

FIELD

This disclosure relates generally to virtual meeting spaces and, more specifically, to multi-user virtual sub-spaces implemented using a multi-user virtual space system and limiting perception levels of media exchanges within multi-user virtual sub-spaces.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
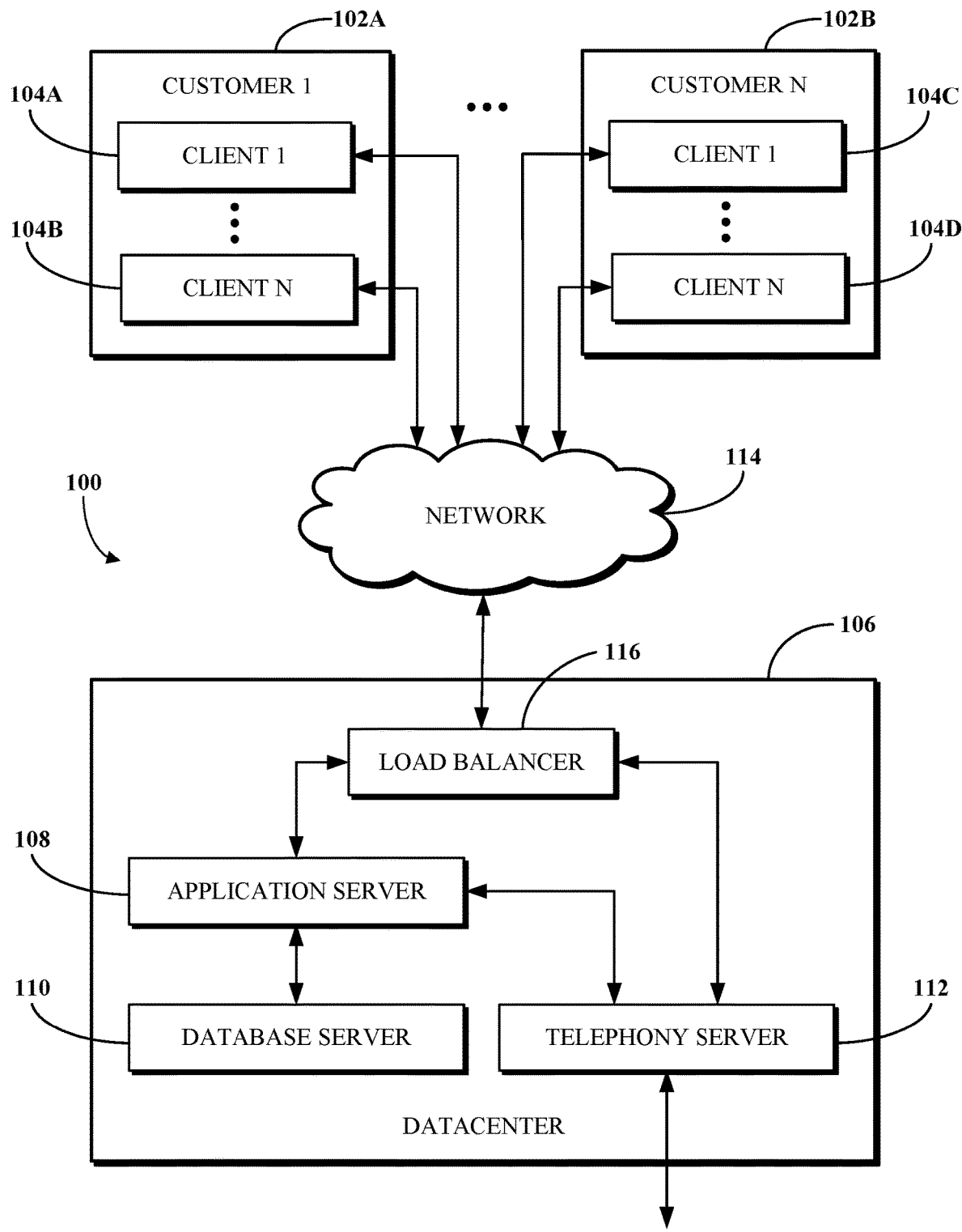
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

One particular example of such a communications service, which may be implemented using a UCaaS platform or otherwise, is a conferencing service that uses conferencing software. Conferencing software is frequently used across various industries to support video-enabled conferences between participants in multiple locations. In some cases, each of the conference participants separately connect to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences in a traditional meeting experience without requiring them to be physically present with one another.

However, while conventional conferencing software approaches are often used to replicate traditional meeting experiences, as described above, such approaches are not usable to facilitate engagements between participants outside of those meeting experiences. For example, during breaks in a video conference, or at one or more times preceding or following a video conference, participants may want to chat with one another in a casual or professional capacity. In some such cases, they may want to form impromptu groups for conversing, in which the groups may have varying levels of privacy based on one or more factors. With fully in-person meeting experiences conducted without conferencing software, participants may be able to freely interact with one another before, after, and during breaks in the meeting. However, conferencing software is designed, both for security and functional purposes, to enable interactions between participants only directly as a part of the hosted meeting experience. In view of such design limitations, participants of a video conference implemented using conventional conferencing software must instead choose one or more other communication methods outside of the video conference to engage with one another outside of the actual hosted meeting experience.

In some cases, conferencing software may enable a waiting room experience for one or more video conference participants to interact with one another before a video conference begins. Typically, such a waiting room is available only before a video conference begins and only to participants of the video conference. As such, if a group of participants wants to interact outside of the video conference itself, they are generally required to set up a new video conference or other separate communication option. This typically involves notifying each participant of and inviting them to the separate communication option. Furthermore, interactions within such a waiting room may be overwhelming for many participants depending on the number of active participants. For example, if too many participants attempt to speak at one time, it may be difficult to comprehend what is being said. Relatedly, there may be instances in which a participant may want to interact with a smaller group of participants and not every participant in the video conference, or a participant may not want to interact with a particular group of participants. For example, a human resources team may not want to be a part of an engineering discussion. In another example, persons associated within a special interest group may not want to share their conversations with an entire organization.

Implementations of this disclosure address problems such as these using a new multi-user virtual space that may exist alongside or independent of a video conference. A multi-user virtual space is a virtual space in which multiple users may interact with one another using voice, video, text, whiteboards, or other communication mediums. Each user may broadcast their interactions to the virtual space for consumption by the users. Thus, a user may communicate with another user of the multi-user virtual space while other users are communicating with a different user. The interactions may take place without centralized control such as a host. Implementations of the multi-user virtual space may detect a connection of users to the multi-user virtual space and form and/or enable the formation of multi-user virtual sub-spaces within the multi-user virtual space. A multi-user virtual sub-space is a sub-space that may exist within the multi-user virtual space. A multi-user virtual sub-space includes some, but generally not all, of the users connected to the multi-user virtual space. A user within a multi-user virtual sub-space may remain within the multi-user virtual space such that the user is able to consume communications broadcast within the multi-user virtual sub-space. A multi-user virtual sub-space may be formed within the multi-user virtual space to focus communications within the multi-user virtual sub-space. Communication within the multi-user virtual sub-space may be focused for the users within the multi-user virtual sub-space while the communications broadcast outside of the multi-user virtual sub-space may have a reduced level of perception for the users of the multi-user virtual sub-space. Forming a multi-user virtual sub-space allows for interactions of subsets of the users connected to the multi-user virtual space in smaller groups while optionally allowing the users to remain a part of the larger multi-user virtual space. A group of users from among the users connected to the multi-user virtual space are assigned to the multi-user virtual sub-space, whether manually (e.g., by themselves or by another one of the users) or automatically (e.g., by software implementing the multi-user virtual sub-space). The multi-user virtual sub-space focuses media exchanges for the group of users by limiting a perception level of media exchanges between users not assigned to the multi-user virtual sub-space relative to a perception level of media exchanges between users assigned to the multi-user virtual sub-space for the users in the multi-user virtual sub-space. One or more such multi-user virtual sub-spaces may be implemented within the multi-user virtual space at a given time. A user connected to the multi-user virtual sub-space may be assigned to multiple multi-user virtual sub-spaces at a given time.

To describe some implementations in greater detail, reference is first made to examples of hardware and software structures used to implement a multi-user virtual space system and functionality thereof. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
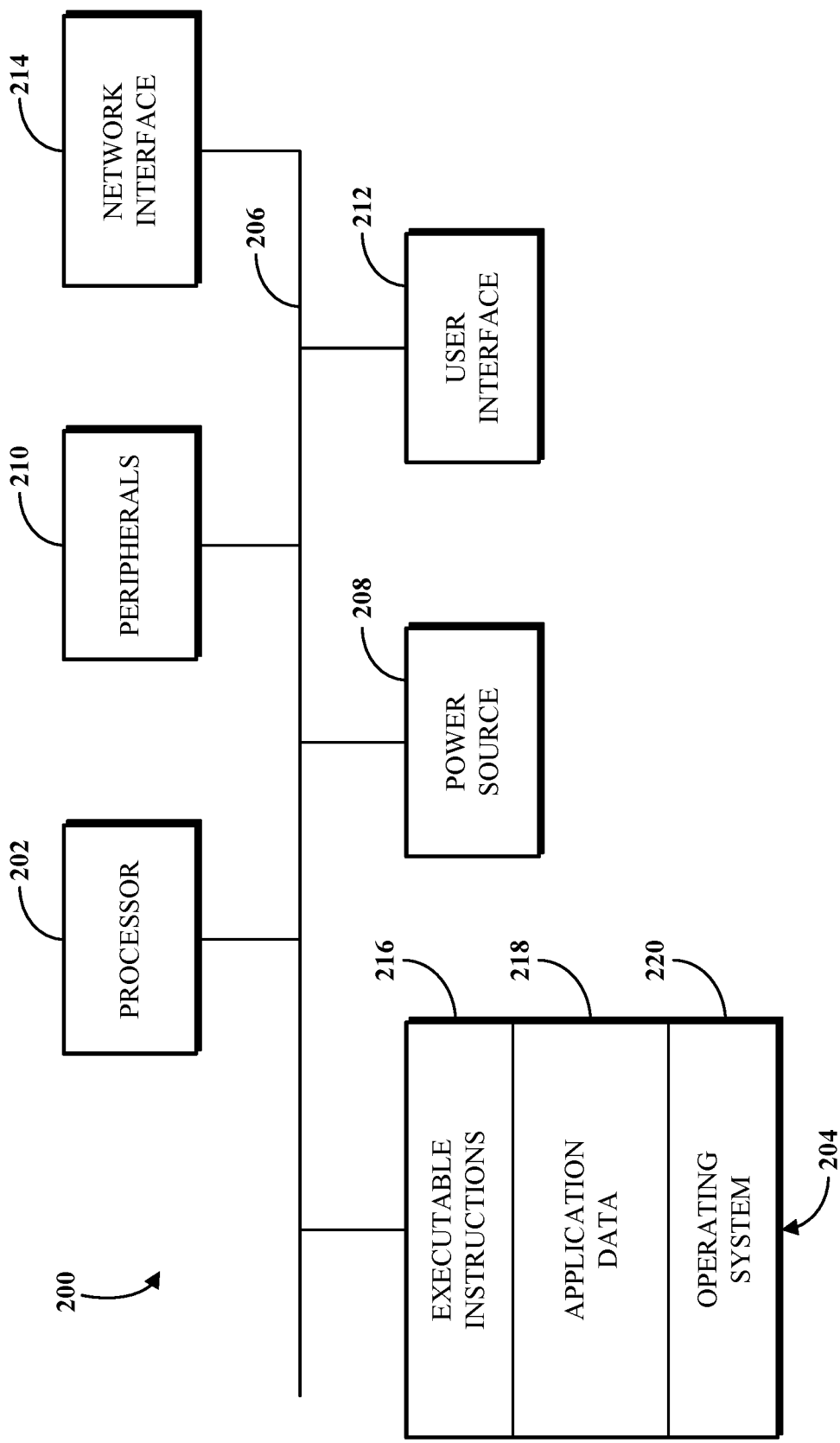
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR DRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
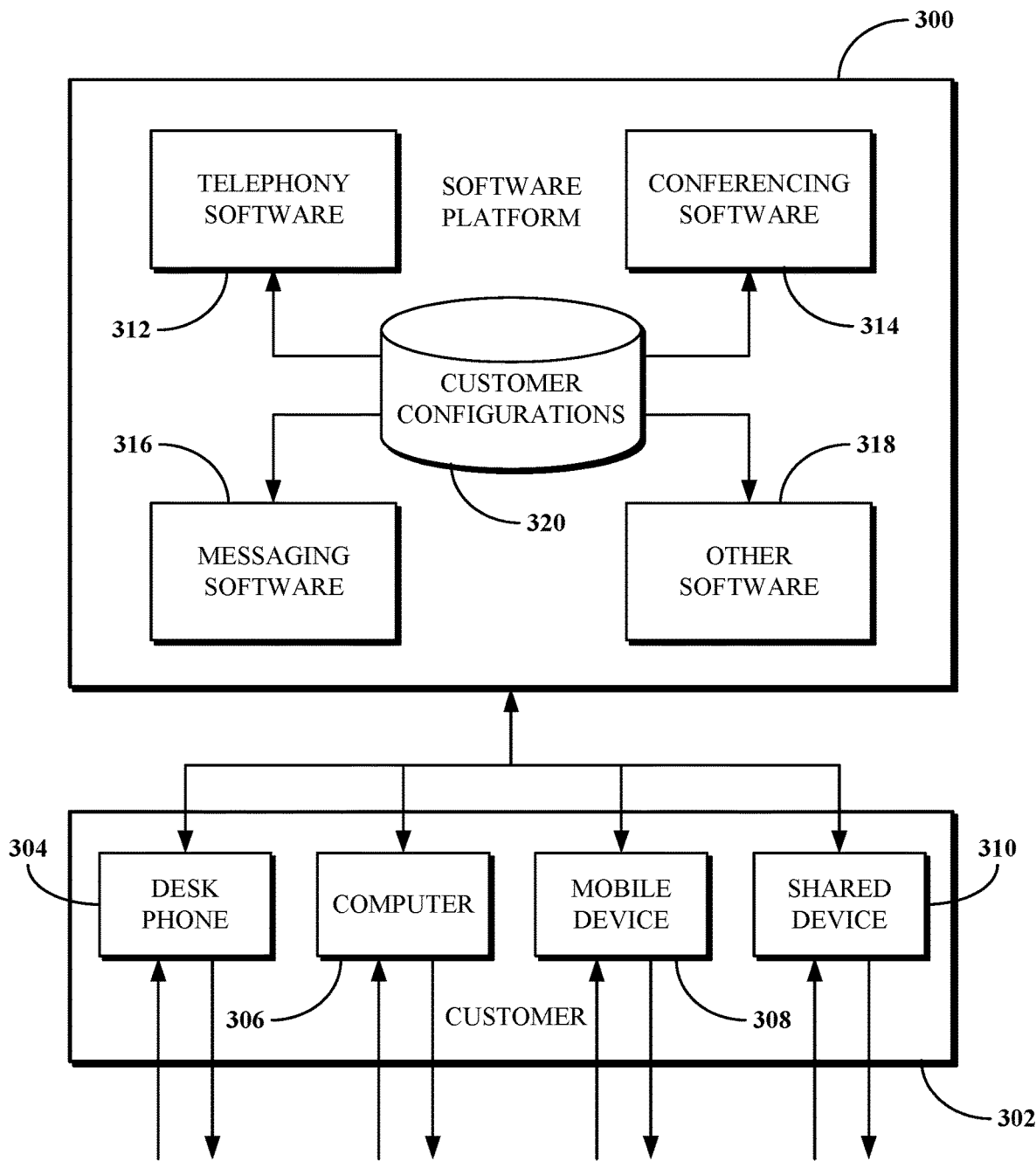
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include multi-user virtual space software for implementing a multi-user virtual space and one or more multi-user virtual sub-spaces of the multi-user virtual space. In some such cases, the conferencing software 314 may include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some, or all, of the software 312 through 318 may be combined into a single software application run on clients of the customer, such as one or more of the clients 304 through 310.

Figure 4:
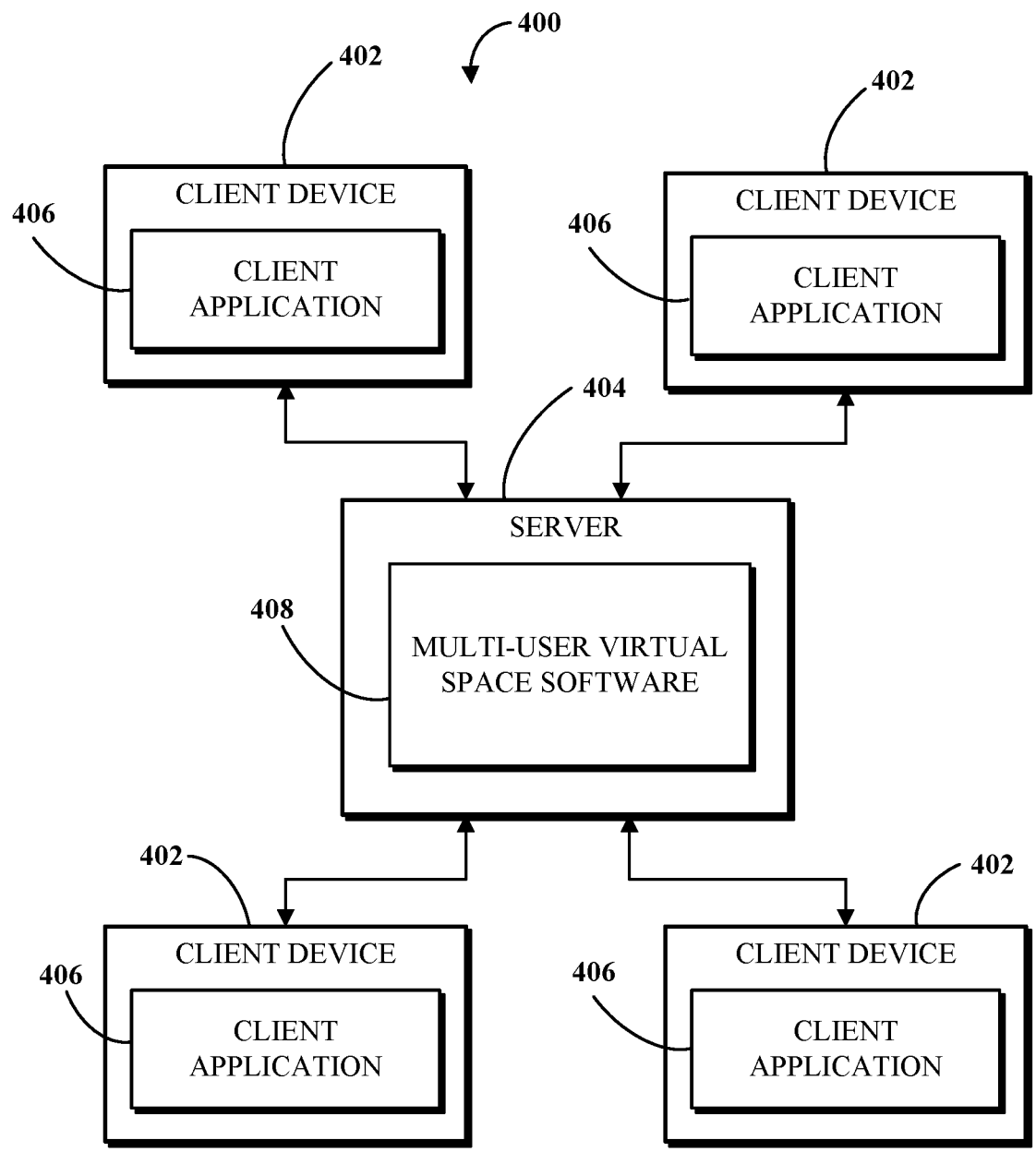
FIG. 4 is a block diagram of an example of a multi-user virtual space system.

FIG. 4 is a block diagram of an example of a multi-user virtual space system 400. As shown, the multi-user virtual space system 400 includes client devices 402 and a server 404. Each of the client devices 402 may be located remotely from the server 404 and may be located remotely from one another. Each of the client devices 402 and the server 404 may communicate with one another over a network. The client devices 402 may correspond to one or more of the clients 104A-D of FIG. 1 and/or to one or more of the clients 304-310 of FIG. 3. The server 404 may correspond to the application server 108 of FIG. 1. For example, the server 404 may be a server used to implement one or more software services of a software platform (e.g., a UCaaS platform), such as the software platform 300.

It is noted that although four client devices 402 are explicitly shown, the multi-user virtual space system 400 can include practically any number of client devices 402. Similarly, although a single server 404 is shown, it should be noted that that the server 404 may be any computing device or system providing the described services and is not limited to a single device. For example, the server 404 may be a physical, standalone server or combination of such servers in a data center. In another example, the server 404 may be a virtual server hosted at a cloud provider and providing service to the client devices 402. In yet another example, the server 404 may be a pool of servers providing redundant services to the client devices 402.

As shown, the client devices 402 include a client application 406. The client application 406, when executed, enables the client device 402 to connect to the server 404 to access a multi-user virtual space and enables the respective client device 402 to transmit and receive media (e.g., audio, video, and/or screensharing data) to the server 404 to interact with the multi-user virtual space. The client devices 402 may transmit and receive the audio, video, and/or screensharing data with the other client devices 402 connected to the multi-user virtual space by routing the audio, video, and/or screensharing data through the server 404. The client application 406 may be an application stored in the memory of the client devices 402. The client application 406 may also include software to control a user's experience with the multi-user virtual space.

The server 404 includes multi-user virtual space software 408. The multi-user virtual space software 408, when executed, causes the server 404 to receive one or more requests from the client device 402, such as requests to connect to the multi-user virtual space, requests to connect the client devices 402 to the multi-user virtual space responsive to the requests, requests to receive media from one of the client device 402 connected to the multi-user virtual space, and/or requests to transmit media to other client devices 402 connected to the multi-user virtual space. The multi-user virtual space software 408 may also include software for managing a multi-user virtual space including forming and/or enabling the formation of multi-user virtual sub-spaces, assigning and/or enabling the assignment of users to a multi-user virtual sub-space, and focusing media exchanges between participants of various ones of the multi-user virtual sub-spaces, as disclosed herein.

Implementing a multi-user virtual space includes transmitting and receiving video, audio, and/or other data between devices connected to the multi-user virtual space, including, for example, the client devices 402. Implementing a multi-user virtual sub-space includes transmitting and receiving video, audio, and/or other data between devices assigned to the multi-user virtual sub-space, including, for example, the client devices 402. Each of the client devices 402 may connect through the server 404 using separate input streams to enable users thereof to participate in the multi-user virtual space and the multi-user virtual sub-space together using the client application 406 and the multi-user virtual space software 408. The multi-user virtual space software 408 or the client application 406 may include a user tile for each input stream received and processed. A user tile as used herein corresponds to a user connected to the multi-participant virtual space and generally refers to a portion of a GUI which displays information (e.g., a rendered video) associated with a device (e.g., one of the client devices 402) connected to the multi-user virtual space. A user tile may, but need not, be generally rectangular. The user tiles may, for example, be similarly or identically sized and arranged in a generally grid layout in the GUI to show consistently represent the various users connected to the multi-participant virtual space. The user tiles may vary in size and presentation depending on whether a user is viewing a multi-user virtual sub-space and whether a user corresponding to the user tile has joined a multi-user virtual sub-space.

The content of the user tile associated with a given device may be dependent upon the source of the input stream for that device. For example, where a participant accesses the multi-user virtual space from a device such as a smartphone or a laptop or desktop computer, the user tile associated with that participant may include a video stream captured at the device and transmitted to the server 404, which is then transmitted from the server 404 to other devices for viewing by other participants (although the participant may optionally disable video features to suspend the video stream from being presented during some or all of the conference).

The multi-user virtual space software 408 may include a thread encoding tool that receives video streams separately from the client devices 402 and encodes those video streams using one or more transcoding tools, such as to produce variant streams at different resolutions. For example, a given video stream received from the client device 402 may be processed using multi-stream capabilities of the multi-user virtual space software 408 to result in multiple resolution versions of that video stream, including versions at 90p, 180p, 360p, 720p, and/or 1080p, amongst others. The video streams may be received from the client device 402 over a network, for example, the network 114 shown in FIG. 1, or by a direct wired connection, such as using a universal serial bus (USB) connection or like coupling aspect. After the video streams are encoded, a switching/routing tool directs the encoded streams through applicable network infrastructure and/or other hardware to deliver the encoded streams to the multi-user virtual space software 408. The multi-user virtual space software 408 transmits the encoded video streams to the client devices 402, which receive and decode the encoded video streams to output the video content thereof for display by video output components.

The multi-user virtual space software 408 may receive a request from a client device 402 to connect to the multi-user virtual space. The multi-user virtual space software 408 may authenticate the connection request prior to connecting the client device 402 to the multi-user virtual space. Once a client device 402 is connected, the multi-user virtual space software 408 may send information about users currently connected to the multi-user virtual space for presentation to the user. The information may include information representing the user tiles of the users connected to the multi-user virtual space. Each user in the multi-user virtual space can broadcast media, such as audio data or video information, to the other users connected to the multi-user virtual space through the multi-user virtual space software 408. The multi-user virtual space software 408 may receive the broadcast media from a client device 402 and transmit the media to the other client devices 402.

The multi-user virtual space software 408 allows for a user to communicate with other users in an open manner. However, such communications may be overwhelming for a user if there are multiple users communicating simultaneously or their communications overlap in time. The multi-user virtual space software 408 implements multi-user virtual sub-spaces in part to address this issue. A user may request the multi-user virtual space software 408 to form a multi-user virtual sub-space, or the multi-user virtual space software 408 may form a multi-user virtual sub-space without a user request as will be described later. Each multi-user virtual sub-space focuses interactions between users that are assigned to the multi-user virtual sub-space by reducing a perception level of media exchanges between users that are not assigned to the multi-user virtual sub-space. In the following description media exchanges between users will be identified as internal if they occur between users assigned to the same multi-user virtual space and external if they include a user than is not assigned to the same multi-user virtual space. External media exchanges may be broadcast from a single user to all of the users connected to the multi-user virtual space, whereas internal media exchanges are broadcast from a single user assigned to a multi-user virtual sub-space to only the users assigned to the multi-user virtual sub-space.

The multi-user virtual space software 408 reduces the perception level of an external media relative to an internal media exchange for the users assigned to a multi-user virtual sub-space. For example, an external audio broadcast by a user in the multi-user virtual space may have a reduced volume relative to the volume of an internal audio exchange such as users assigned to the multi-user virtual sub-space conversing with one another. Because a user assigned to the multi-user virtual sub-space may still perceive the external audio, the user may be able to respond if the user perceives a subject of interest. However, because the perception level of the external audio is reduced for the user, the external audio may not interfere with internal interactions within the multi-user virtual sub-space. For example, a user may perceive the external audio as background noise and generally ignore the external audio. However, if the user's name is spoken in the external audio, the user may still perceive that someone spoke their name and shift their attention to the multi-user virtual space.

The multi-user virtual space software 408 may provide for a user to observe interactions in a multi-user virtual sub-space that the user is not assigned to. For example, the multi-user virtual space software 408 may provide a transcript, automated summary, or other information about interactions within a multi-user virtual sub-space that a user may observe. As an example, the multi-user virtual space software 408 may use speech-to-text to generate a transcript for a multi-user virtual sub-space. The multi-user virtual sub-space may use the transcript to generate a summary which may be display to a user. In some examples, a user may request that the multi-user virtual space software 408 notify the user if a subject of interest is brought up by users in a multi-user virtual sub-space. The multi-user virtual space software 408 may notify the user if the multi-user virtual space software 408 detects the subject of interest in a multi-user virtual sub-space.

The multi-user virtual space software 408 may also allow a user to shift attention in the multi-user virtual space by increasing a perception level. For example, a user may select a multi-user virtual sub-space that the user is not assigned to and observe the internal media within the selected multi-user virtual space, subject to any privacy or permission controls of the multi-user virtual sub-space. For example, the internal audio of the multi-user virtual sub-space may increase in volume. In some instances, a user may select a multi-user virtual sub-space using a GUI of the multi-user virtual space software 408 to shift attention to that multi-user virtual sub-space. The shifting of attention may occur for a multi-user virtual sub-space that the user is not joined to or, if a user is joined to multiple multi-user virtual sub-spaces, the user may switch attention between the multi-user virtual sub-spaces. In some examples, the user may select the multi-user virtual space to shift their focus back to the multi-user virtual space. Using the previous example, if a user hears their name in the multi-user virtual space, the user may shift their attention to the multi-user virtual space by selecting the multi-user virtual space in the GUI to increase the perception level of the external media exchanges.

The multi-user virtual space software 408 may provide privacy tools at a user level and at a multi-user virtual sub-space level. At a user level, a user may opt in or out of different features of the multi-user virtual space software 408. For example, a user may be able to choose whether their media is transcribed, summarized, recorded, and whether their presence in a multi-user virtual sub-space is indicated to other users. Other privacy options may be available to each user. At a multi-user virtual sub-space level, when a multi-user virtual sub-space level is formed a user within the a multi-user virtual sub-space may select privacy options for the a multi-user virtual sub-space level, such as whether media in the whether their media is transcribed, summarized, recorded, and whether their presence in a multi-user virtual sub-space is indicated to other users will be transcribed, summarized, recorded, or output to other users and whether users presence in a multi-user virtual sub-space is indicated to other users not in the whether their media is transcribed, summarized, recorded, and whether their presence in a multi-user virtual sub-space is indicated to other users. Other privacy options may be available for a multi-user virtual sub-space.

The multi-user virtual space software 408 may mange permissions for the multi-user virtual space and multi-user virtual sub-spaces. In some examples, permissions may determine whether a user is allowed to create a multi-user virtual sub-space and/or share content in a multi-user virtual sub-space. Additionally, a user requesting the formation of a multi-user virtual sub-space may set permissions specific to the multi-user virtual sub-space including which users can participate in the multi-user virtual sub-space, which users can share content in the multi-user virtual space, and which users can observe the multi-user virtual sub-space without participating in the multi-user virtual sub-space. Other permissions are possible. The permissions may be set on a per user basis, a group basis, or other basis such as by invitation only.

In addition to the privacy option, each user may have individual options controlled by the multi-user virtual space software 408 such as presentation options and default multi-user virtual sub-space options. Presentation options may include options such as the amount by which the perception of external media is reduced within a multi-user virtual sub-space, a layout of the multi-user virtual space user tiles, a layout of the multi-user virtual sub-space user tiles, a format and amount of information to view for multi-user virtual sub-spaces, a user has not assigned to, and the number of multi-user virtual sub-spaces the user is not assigned to present at a time.

In some implementations, other software services may be accessible in connection with a multi-user virtual space implemented using the multi-user virtual space system 400. For example, a multi-user virtual space may include or otherwise integrate functionality for instant messaging, unified messaging, and other types of messaging communications between participants of the conference, such as to facilitate a chat or like virtual conversation between users of those participants. Those other software services may be implemented at the multi-user virtual space system 400 and/or a different aspect of the system 100.

Figure 5:
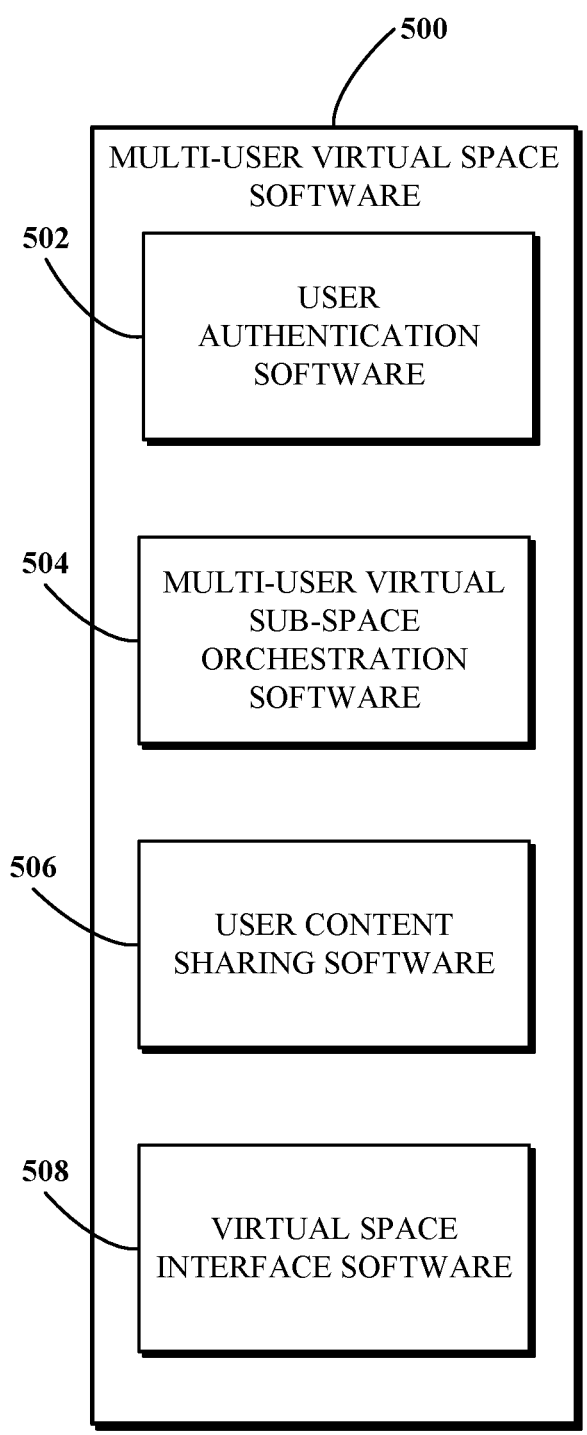
FIG. 5 is a block diagram of example functionality of multi-user virtual space software.

FIG. 5 is a block diagram of example functionality of multi-user virtual space software 500. The multi-user virtual space software 500 is software usable with a multi-user virtual space platform (e.g., implemented using the multi-user virtual space system 400) for controlling a multi-user virtual space as described herein. The multi-user virtual space software 500 may reside at a computing device, for example, the server 404. For example, the multi-user virtual space software 500 may be the multi-user virtual space software 408 of FIG. 4. In some implementations, a first part of the multi-user virtual space software 500 may reside at a client device connected to the server 404 (e.g., one of the client devices 402 of FIG. 4) and a second part of the multi-user virtual space software 500 may reside at the server 404.

As shown, the multi-user virtual space software 500 includes user authentication software 502, which detects a user connecting to a multi-user virtual space. In some cases, the user may connect to the multi-user virtual space in connection with a video conference. For example, multi-user virtual space and a related video conference may be controlled by the same entity and the entity may implement both the video conference and the multi-user virtual space for user. Thus, a user may take part in the video conference and join the multi-user virtual space during before, after, or during breaks of the video conference. In such a case, the user authentication software 502 may receive a token, a key, or other authentication information from the video conference software that may be used to authenticate with the multi-user virtual space software 500. In some examples, the user may automatically connect to the multi-user virtual space, such as by conferencing software used to implement the video conference routing the user to the multi-user virtual space in response to a connection or disconnection between the conferencing software and a client application or other software at the device of the user. For example, the user may be taken to the multi-user virtual space before and/or after the video conference. In another example, the user may be taken to the video conference and disconnected from the multi-user virtual space responsive to the video conference starting, resuming, or stopping. In some examples, the user may manually connect to the multi-user virtual space, such as by using the client application 406 to manually request a connection. The client application 406 may be configured to automatically connect to a known instance of the multi-user virtual space software 500, or the client application 406 may prompt the user to select an instance of the multi-user virtual space software 500. In such examples, the user may manually authenticate themselves with the user authentication software 502 to join the multi-user virtual space. In each of the examples, the user authentication software 502 detects the authentication of the user as a connection to the multi-user virtual space.

In another example, a multi-user virtual space may not have any related video conference. For example, an instance of the multi-user virtual space software 500 may run indefinitely without being tied to a video conference. Or, in another example an instance of the multi-user virtual space software 500 may run during specific times that are not related to a video conference, such as during normal business hours. In such examples, a user may manually join the multi-user virtual space using the client application 406 and provide authentication information to the user authentication software 502. The user authentication software 502 detects the authentication of the user as a connection to the multi-user virtual space.

The multi-user virtual space software 500 includes multi-user virtual sub-space orchestration software 504. The multi-user virtual sub-space orchestration software 504 controls the multi-user virtual sub-spaces of the multi-user virtual space. Control of the multi-user virtual sub-spaces includes grouping users into groups of users, forming multi-user virtual sub-spaces, assigning a group of users to a multi-user virtual sub-space, adding/removing a user from a multi-user virtual sub-space, and/or monitoring user interactions within the multi-user virtual space, or otherwise enabling one or more of the above. The multi-user virtual sub-space orchestration software 504 may perform other functions related to the control of the multi-user virtual sub-spaces such as enforce privacy controls, enforce user permissions, generate summaries of multi-user virtual sub-spaces, and regulate the perception level of media exchanges outside of a given multi-user virtual sub-space.

The multi-user virtual sub-space orchestration software 504 may group users and assign the group of users to a multi-user virtual sub-space using various criteria. In some instances, the multi-user virtual sub-space orchestration software 504 may form a multi-user virtual sub-space upon request of a user. The user requesting the formation of the multi-user virtual sub-space may be assigned as a host of the multi-user virtual sub-space and may be responsible for setting permissions and privacy control levels for the multi-user virtual sub-space. The multi-user virtual sub-space orchestration software 504 may perform automatic assignments of groups of users to a multi-user virtual sub-space, or in some instances may assign users to multi-user virtual sub-space based on a request from a user. Users may be assigned to more than one group and the users may leave or join groups upon request to the multi-user virtual sub-space orchestration software 504. Such a request may be made by a user through the client application 406 or a user acting as a host of a multi-user virtual sub-space.

In some instances, the multi-user virtual sub-space orchestration software 504 may form a multi-user virtual sub-space without any users being assigned to the multi-user virtual sub-space. For example, the multi-user virtual space may have a default set of multi-user virtual sub-spaces that users may join. Or a user may request the formation of a multi-user virtual sub-space without requesting any users be assigned to the multi-user virtual sub-space. In some instances, a multi-user virtual sub-space may have a default background noise that may be output if there are limited media exchanges within the multi-user virtual sub-space. The default background noise may be white noise or other media such as music. The background noise may automatically reduce in volume when media exchanges in the multi-user virtual sub-space begin. In some instances, the level of the background noise may be selected as an option by a user.

The multi-user virtual sub-space orchestration software 504 may automatically assign users to a multi-user virtual sub-space based on a group of users having a common characteristic or being related to one another in some fashion. For example, the multi-user virtual sub-space orchestration software 504 may make an initial assignment of users based on a common characteristic such as the users working in the same department, working for the same manager, having similar responsibilities, working on a common project, or other characteristic of the users. The common characteristic may be a current characteristic, a past characteristic, or a future characteristic. In some examples, users may self-identify characteristics such as interests, hobbies, geographic location, etc. Additionally, users may opt in to tracking by the multi-user virtual sub-space orchestration software to assist in identifying users to assign to a multi-user virtual sub-space. For example, the multi-user virtual sub-space orchestration software may monitor interactions among users who opt in and save information identifying users that interact more frequently relative to other users. The multi-user virtual sub-space orchestration software may then use this information to identify users to group together and assign to a multi-user virtual sub-space.

In some examples, the multi-user virtual sub-space orchestration software may access an external data source containing relationship information for the user. For example, a past characteristic stored in the external data source may include information such as past projects associated with a user. The multi-user virtual sub-space orchestration software may use this information to identify users that previously worked on the same project to group together and assign to a multi-user virtual sub-space. In another example, an external data source may store a social graph of the users. The multi-user virtual sub-space orchestration software may access the social graph to identify users having social connections as indicated by the social graph. The users having social connections may be assigned to a multiuser virtual sub-space. In another example, the external data source may store information about past communications between users, such as a history of emails being passed between users, a history of chat messages between users, history of phone calls between users, or other records of past communications. The records of past communications may be to identify users that communicate frequently with one another. In one such example, users that communicate more frequently may be more likely to be assigned to the same multi-user virtual sub-space than users that communicate less frequently. Alternatively, to foster new relationships, users that communicate less frequently may assigned together in a multi-user virtual sub-space.

In some instances, the multi-user virtual sub-space orchestration software may provide the external data source with identifiers of the users connected to the multi-user virtual space and receive relationship data in response. The multi-user virtual sub-space orchestration software may use the relationship data to identify relationships to use when assigning users to a multi-user virtual sub-space. In other instances, the multi-user virtual sub-space orchestration software may provide the external data source with the identifiers of the users connected to the multi-user virtual space and the external data source may identify relationships between the users. The external data source may return the relationship data as recommended groups to assign to a multi-user virtual sub-space.

The multi-user virtual sub-space orchestration software 504 may assign a weight to the different characteristics when determining groups of users to assign to a multi-user virtual sub-space. For example, a multi-user virtual sub-space that is work related may place a greater weight on common projects for users when assigning users to a multi-user virtual sub-space. However, a multi-user virtual sub-space that is recreational in nature may place a higher weight on a social graph of the users. The different characteristics may be categorized into categories such as work related, recreation relation, professional, common interests, etc. The weighting of each characteristic and/or category of characteristic for identifying users to assign to a sub-space may be selected by an administrator of the multi-user virtual space. Other characteristics beyond those described herein may be used to identify users to assign to a multi-user virtual sub-space. In some examples, the multi-user virtual sub-space orchestration software 504 may make recommendations for users to join a group assigned to a multi-user virtual sub-space. In such a case, a user may manually be assigned to a multi-user sub-space by the user accepting the recommendation, or the user may decline the recommendation to avoid assignment into the subject multi-user virtual sub-space.

Users may be able to leave, join, and form new multi-user virtual sub-spaces separate from an initial (e.g., automatic) assignment to a multi-user virtual sub-space. In some examples, a user connected to the multi-user virtual space may not be initially assigned to a multi-user virtual sub-space, and the user may instead request the multi-user virtual sub-space orchestration software 504 to form a new multi-user virtual sub-space. In some such cases, the user may further request the multi-user virtual sub-space orchestration software 504 to assign users to the multi-user virtual sub-space. The user may cause the formation of the new multi-user virtual sub-space based on a specified topic or otherwise. For example, a user may determine that they would like to form a multi-user virtual sub-space of users having pets. The user may request the multi-user virtual sub-space orchestration software 504 to form a "Pets" multi-user virtual sub-space. In some examples, the multi-user virtual sub-space orchestration software 504 may recommend users having the common characteristic, in this instance users who self-identified as having a pet, to be assigned to the "Pets" multi-user virtual sub-space. Additionally, or alternatively, the user requesting that the multi-user virtual sub-space be formed may also include an identification of users to assign to the multi-user virtual sub-space. The multi-user virtual sub-space orchestration software 504 may recommend that the users identified by the requesting user be assigned to multi-user virtual sub-space.

The multi-user virtual sub-space orchestration software 504 may modify which users are assigned to a multi-user virtual sub-space after the multi-user virtual sub-space is formed. For example, a user may send a request to the multi-user virtual sub-space orchestration software 504 for the user to join a multi-user virtual sub-space or leave a multi-user virtual sub-space. The multi-user virtual sub-space orchestration software 504 may carry out the users request by assigning or removing the assignment of the user to the multi-user virtual sub-space.

In some examples, a multi-user virtual sub-space may have a security setting to control who is allowed in a multi-user virtual sub-space and what content is visible from the multi-user virtual sub-space to the multi-user virtual space. The security setting may have a default value or a value set by a user that requested the formation of the multi-user virtual sub-space. Furthermore, the security setting may be applied against all users assigned to the multi-user virtual space, or it may alternatively be applied against individual users. For example, if a sensitive topic is being discussed in a multi-user virtual sub-space, a user may set a permission that only particular users are allowed to be assigned to the multi-user virtual sub-space or that only users having a specified characteristic are allowed to be assigned to the multi-user virtual sub-space. In some cases, in which the security setting is applied against individual users, the specific settings and users may be defined manually by the user that requested the formation of the multi-user virtual sub-space or automatically by the multi-user virtual sub-space orchestration software 504 (e.g., based on data associated with such individual users). For example, a user requesting the formation of the multi-user virtual sub-space may request that a particular individual user having specified characteristics is not allowed to be assigned to the multi-user virtual sub-space or is prohibited from sharing content within the multi-user virtual sub-space. Similar requests from a user to the multi-user virtual sub-space orchestration software 504 may be made to control what details users not assigned to the multi-user virtual sub-space are able to observe in the multi-user virtual sub-space.

In some examples, the multi-user virtual sub-space orchestration software 504 may provide an analogy of a building layout to a user in response to a user requesting the formation of a multi-user virtual sub-space. The analogy may be helpful for assisting a user in selecting privacy controls and other options. For example, a user may select a multi-user virtual sub-space corresponding to a physical area of a building such as a foyer, hallway, office room, reception area, or conference room. Each building area may have corresponding privacy controls and options. For example, a foyer may have no limit on users assigned to the multi-user virtual sub-space and no privacy controls, an office room may have a limited number of users that may be assigned and greater privacy, and a conference room represent middle ground between the foyer and the office room.

The multi-user virtual space software 500 includes user content sharing software 506. The user content sharing software 506 provides user content tools for the users in a multi-user virtual sub-space to share user content with other users in the sub-space and in some examples, with users not in the sub-space. The user content sharing software 506 may include screen sharing tools, whiteboards, file upload interfaces, shared applications, and other user content tools. The users assigned to the multi-user virtual sub-space may control the visibility of the user content shared using the content sharing software to the multi-user virtual space. For example, a user may be able to select whether the user content should be accessible or observed from outside of the multi-user virtual sub-space.

The multi-user virtual space software 500 includes virtual space interface software 508. The virtual space interface software 508 may generate data for outputting an interface with a user including displaying a portion of a GUI for some or all of the users and outputting media exchanges within the multi-user virtual space. The GUI will be described in more detail in the description of FIG. 6 through FIG. 8. Generally, the virtual space interface software 508 is responsible for generating data for displaying a representation of the multi-user virtual space, a representation of a multi-user virtual sub-space for users assigned to the multi-user virtual sub-space, representations of multi-user virtual sub-spaces for users not assigned to the multi-user virtual sub-space. The virtual space interface software 508 is also responsible for outputting media exchanges between users and focusing internal media exchanges by limiting a perception level of external media within the multi-user virtual sub-space relative to external media exchanges.

The virtual space interface software 508 may limit a perception level of external media exchanges by altering a characteristic of the external media exchange before presenting the external media exchange to users connected to a multi-user virtual space. The altered characteristic is at least one characteristic that effects how the media exchange is perceived and is dependent on the format of external media exchange. The altered characteristic may include amplitude, resolution, brightness, or intensity. For example, if an external media exchange is an audio media exchange, the virtual space interface software 508 may limit the perception level by reducing an amplitude of the volume of the audio. In another example, a media exchange in the form of a video may be altered by reducing the resolution and size of the video. Similarly, an image media exchange may be altered by reducing the resolution and size of the image.

The reduced perception level of external media may allow a user to be aware of the external media while still being able to interact with other users in the multi-user virtual sub-space. The virtual space interface software 508 further allows the user to select a multi-user virtual sub-space or the multi-user virtual space to shift their attention to the multi-user virtual sub-space or the multi-user virtual space. For example, a user may be aware of the external media to identify if an event of interest occurs, such as someone speaking the user's name. The user may select a multi-user virtual space to shift to at least partially restore the perception level of the external media to shift attention to the multi-user virtual space. In another example, if another multi-user virtual sub-space becomes of interest to the user, the user may select the multi-user virtual sub-space to observe the internal media exchanges in the multi-user virtual sub-space.

In some instances, the virtual space interface software 508 may allow a user to override the reduced perception level of eternal media for a particular multi-user virtual sub-space or the multi-user virtual space. For example, if a user is interested in another multi-user virtual sub-space, the virtual space interface software 508 may allow the user to override the reduced perception level of the internal media exchanges for that particular multi-user virtual sub-space for the user. This may be done by the virtual space interface software 508 without the user joining the particular multi-user virtual sub-space or leaving their current multi-user virtual sub-space. In some examples, a user may temporarily override the reduced perception level of internal media exchanges of a particular multi-user virtual sub-space by hovering a cursor, long pressing a touch interface, or performing another user interaction with regard to the particular multi-user virtual sub-space of interest. The virtual space interface software 508 may, in response to the user interaction, override the reduced perception level of the internal media exchanges within the particular multi-user virtual sub-space for the user. In some examples, overriding the reduced perception level may include temporality reducing the perception level of the multi-user virtual sub-space that the user is temporarily a member of. For example, a user may identify that a topic in a particular multi-user virtual sub-space is of interest to the user and hover a cursor over a graphical representation of the particular multi-user virtual sub-space. The virtual space interface software 508 may then increase the volume level of the internal media exchanges of the particular multi-user virtual sub-space and decrease the volume level of the internal media exchanges of the user's current multi-user virtual sub-space. The virtual space interface software 508 may then restore the reduced perception level for the internal media exchanges of the particular multi-user virtual sub-space and the normal perception level of the internal media exchanges in the user's current multi-user virtual sub-space in response the user moving their cursor away from the graphical representation of the particular multi-user virtual sub-space.

Figure 6:
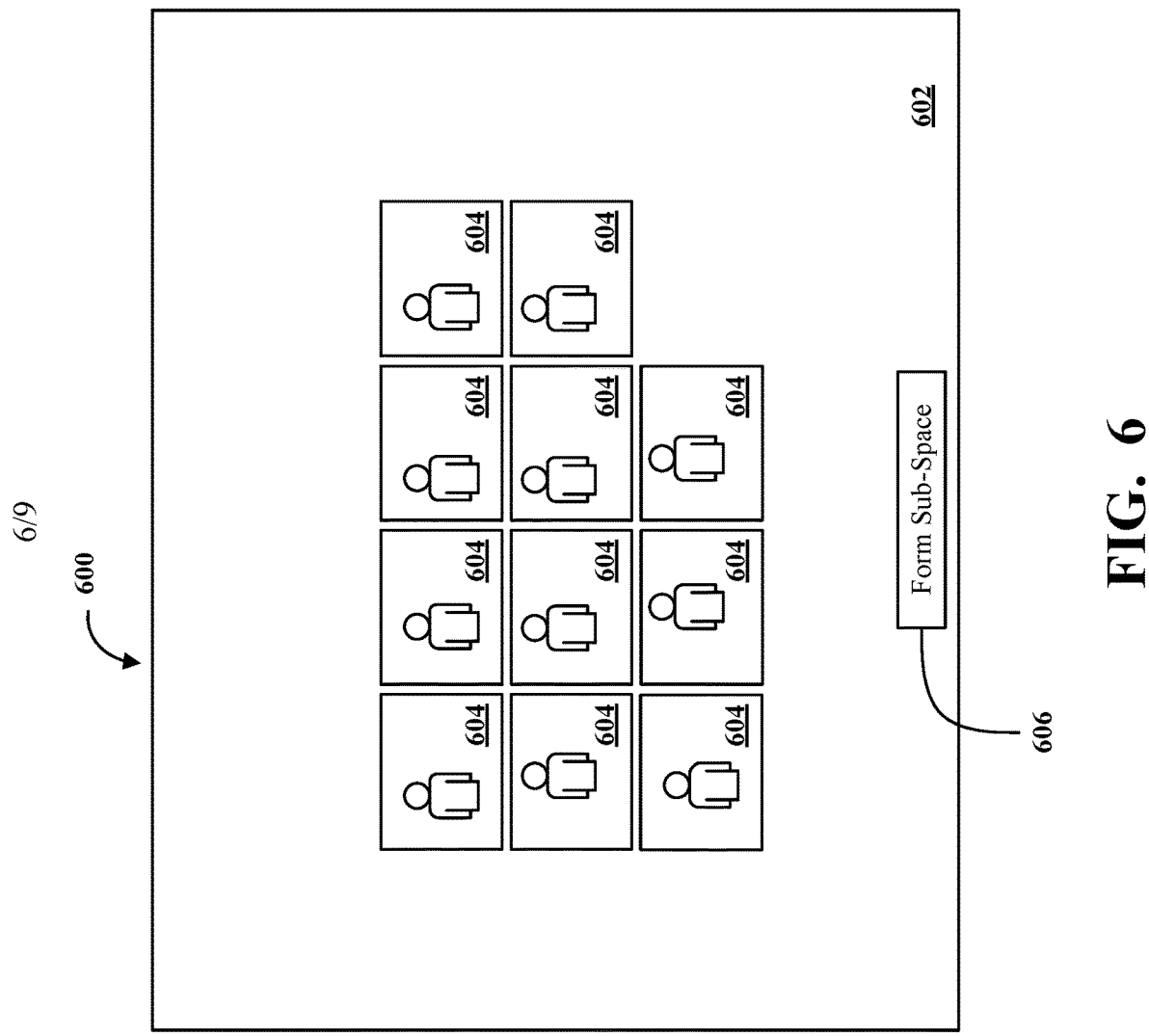
FIG. 6 is an example of a graphical user interface (GUI) presented to a user upon joining a multi-user virtual space.
Figure 7:
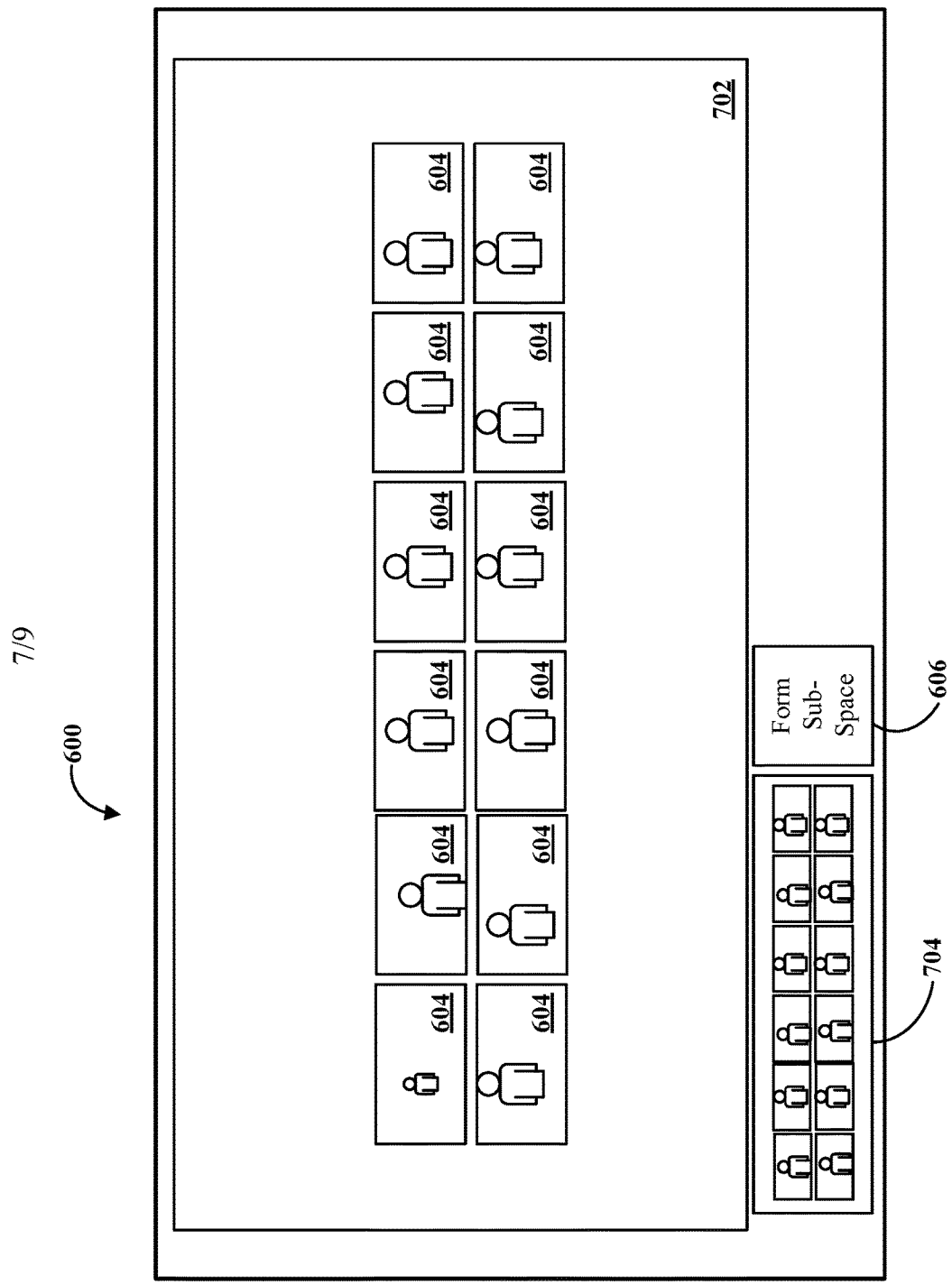
FIG. 7 is an example of a GUI presented to a user that is assigned to a multi-user virtual sub-space.
Figure 8:
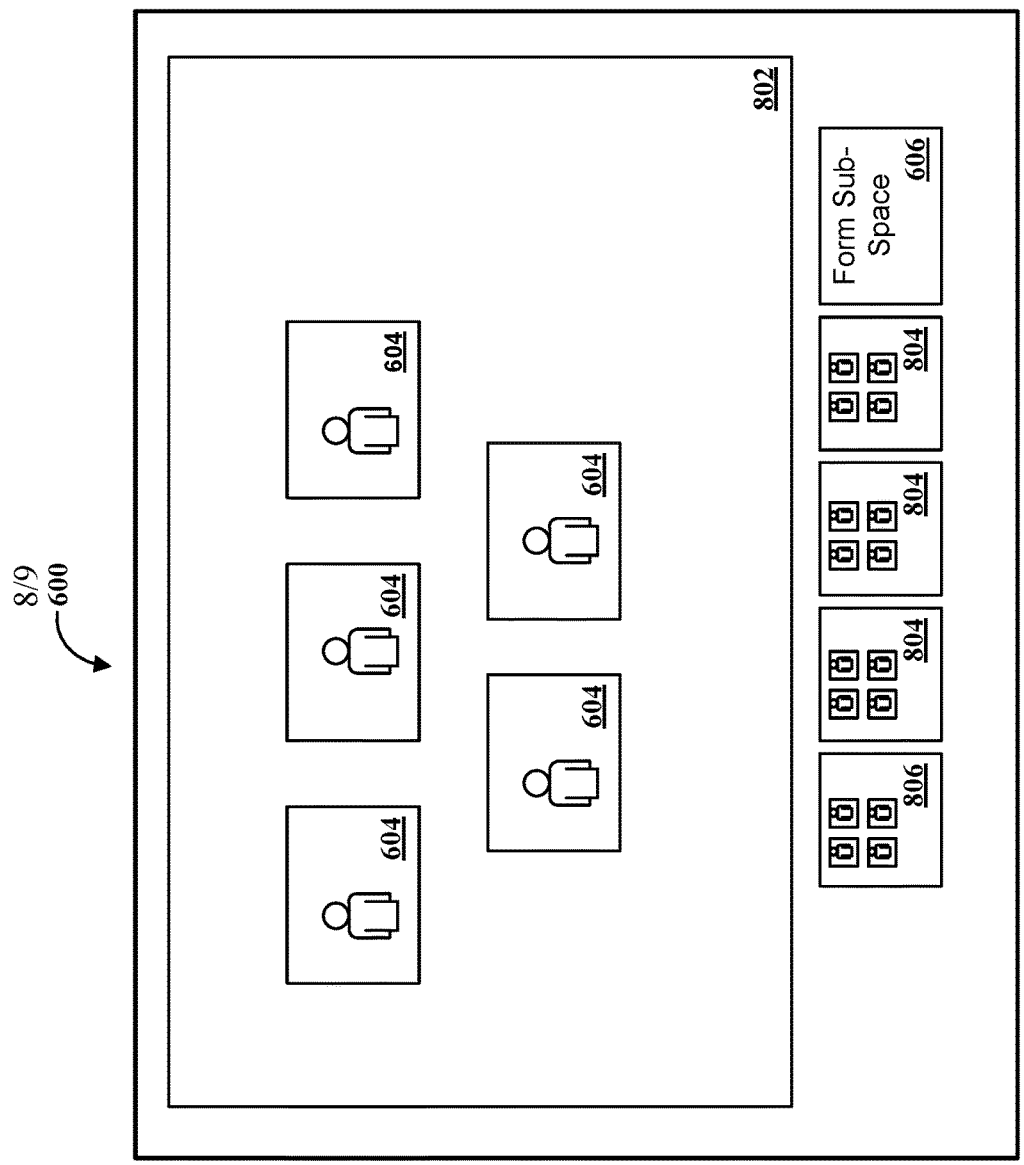
FIG. 8 is an example of a GUI presented to a user showing multiple multi-user virtual sub-spaces.

FIG. 6 is an illustration of an example of a GUI 600 that may be displayed at a client device to a user based on data generated by the virtual space interface software 508. The GUI 600 as shown in FIG. 6 through FIG. 8 may be a portion of a larger GUI of a client device, such as a window of the larger GUI. In some examples the GUI may be a contained within a GUI of the multi-user virtual space system 400. The GUI 600 will be used to describe the operation of a multi-user virtual space platform, but it will be noted that multi-user virtual space platforms are not limited to the example GUI shown. Other GUIs are possible, and, in some examples, GUIs may vary for different users of a multi-user virtual space platform. For example, a user may be able to select a GUI based on their personal preferences or device type. Additionally, the GUI 600 may have views that are specific to an individual user depending on a multi-user virtual sub-space they are assigned to and the security setting of other users.

The GUI 600 as shown in FIG. 6 represents the GUI 600 in an initial state with no multi-user virtual sub-spaces having been formed. For example, the GUI 600 may appear as shown to a user when the user initially connects to a multi-user virtual space. The GUI 600 includes a gallery 602 showing users who have connected to the multi-user virtual space. The gallery 602 may include user tiles 604, such as user interface tiles as previously described, for each user connected to the multi-user virtual space. Additionally, the GUI 600 may include a control 606 for forming a multi-user virtual sub-space.

The gallery 602 may allow interactions between the users in the multi-user virtual space. For example, a user may be able to converse with other users connected to the multi-user virtual space or send media to the users connected to the multi-user virtual space. Additionally, the users may be able to interact with each other using other media such as by messaging (e.g., via group or individualized chat messages). However, while such media exchanges are generally permitted, challenges therewith may arise based on the greater presence of users in the multi-user virtual space. In the example shown, there are ten user tiles corresponding to ten users. If all ten users were to attempt to speak at the same time, it would be difficult to comprehend what each user was communicating. This difficulty is accentuated with more users and the usefulness of the multi-user virtual sub-spaces becomes apparent.

Some or all of the users may thus be assigned to one or more multi-user virtual sub-spaces. A user may select the control 606 for forming a multi-user virtual sub-space manually, or the multi-user virtual sub-space orchestration software 504 may in some cases form a multi-user virtual sub-space automatically, such as in response to a trigger event (e.g., based on the number of users connected to the multi-user virtual space exceeding a threshold). After the user selects the control 606 to start a multi-user virtual sub-space, the user may be prompted to identify the multi-user virtual sub-space, select participants to assign to the multi-user virtual sub-space, and/or select any desired security options for the multi-user virtual sub-space. For example, the user may be prompted to enter text describing the multi-user virtual sub-space for other users to view. In some examples, the multi-user virtual sub-space orchestration software 504 may provide suggestions to the user for selecting participants. In some examples, a user may start a multi-user virtual sub-space by interacting with a user tile 604 of a user in the gallery 602. For example, a user may select user tiles 604 of users for joining a sub-space and drag the group of user tiles 604 to the control for creating a sub-space. In another example, a user may drag a user tile 604 on top of another tile to form a multi-user virtual sub-space for those users.

The GUI 600 as shown in FIG. 7 represents the GUI 600 as it may appear to a user assigned to the multi-user virtual sub-space after the multi-user virtual sub-space is formed. Unlike the GUI 600 as shown in FIG. 6, the GUI 600 no longer displays the gallery 602 of users. Instead, the GUI 600 now shows a sub-space gallery 702 of user tiles 604 that are assigned to multi-user sub-space. The sub-space gallery 702 includes only users that are assigned to the multi-user virtual sub-space. Additionally, the GUI 600 in FIG. 7 now includes a representation of the multi-user virtual sub-space 704. In this example, the representation of the multi-user virtual sub-space is a miniaturized version of the sub-space gallery 702, but in other examples the representation of the multi-user virtual sub-space may include textual representations, icons, or other graphical elements.

The representation of the multi-user virtual sub-space 704 indicates that the multi-user virtual sub-space exists and gives a summary of information about the multi-user virtual sub-space. For example, the representation of the multi-user virtual sub-space 704 may identify the users in the multi-user virtual sub-space 704 by displaying the user tiles 604 for the users. The user tiles may be shown at a reduced resolution compared to the user tiles 604 of the gallery 602. The information displayed in the representation of the multi-user virtual sub-space 704 may vary depending on a security setting or preferences set by a user assigned to the multi-user virtual sub-space 704. For example, a user may modify their visibility so that their user tile 604 does not display in the representation of the multi-user virtual sub-space 704. The security setting may be set for all users in the multi-user virtual sub-space. For example, a security setting for the multi-user virtual sub-space may indicate that no user tiles 604 should be visible in the GUI 600 for users not assigned to the multi-user virtual sub-space.

In addition to the user tiles 604, the representation of the multi-user virtual sub-space 704 may display other information such as the identification of the multi-user virtual sub-space or an autogenerated summary for the activity in the multi-user virtual sub-space. For example, the multi-user virtual sub-space orchestration software 504 may monitor the users' activity in the multi-user virtual sub-space and provide an automated summary of the activity. In some examples, the multi-user virtual sub-space orchestration software 504 may use tools such as voice recognition to identify activity. The multi-user virtual sub-space orchestration software 504 may identify keywords used within the multi-user virtual sub-space to generate the automated summary.

In some examples, a user may identify topics, keywords, or other information of interest to the user and submit the information to the multi-user virtual sub-space orchestration software 504. The multi-user virtual sub-space orchestration software 504 may monitor the multi-user virtual sub-spaces for the topics, keywords, or other information of interest submitted by the user and alert the user when the topics, keywords, or other information of interest is identified. The multi-user virtual sub-space orchestration software 504 may provide the user with summaries of the discussion in which the topics of interest were discussed. The summaries may be enhanced relative to the automated summaries of activity displayed on the GUI. The multi-user virtual sub-space orchestration software 504 may automatically suggest assigning the user to the multi-user virtual sub-space in which the topics, keywords, or other information was identified. Thus, the user is able to focus on interaction in the multi-user virtual sub-space they are assigned to while being able to jump in and out of other multi-user virtual sub-spaces as topics of interest are discussed.

A user that is not assigned to the multi-user virtual sub-space may be able to observe the activity in the multi-user virtual sub-space using the automated summary provided by the representation of the multi-user virtual sub-space 704. For example, the user may be able to quickly identify topics being discussed in the multi-user virtual sub-space without having to be a participant in the multi-user virtual sub-space. In some instances, a user may determine that they should join the multi-user virtual sub-space based on the summary information provided by the representation of the multi-user virtual sub-space 704. The user may request to join the multi-user virtual sub-space by interacting with a user control of the GUI 600. For example, the user may double click the representation of the multi-user virtual sub-space 704 to request to be assigned to the multi-user virtual sub-space. In another example, a user may drag a user tile 604 from the gallery 602 to the multi-user virtual sub-space to request to be assigned to the multi-user virtual sub-space. In such examples, a user may drag their own user tile 604 to the representation of the multi-user virtual sub-space 704 to join the multi-user virtual sub-space, or in another example, they may drag a user tile 604 of another user to invite them to join the multi-user virtual sub-space.

The GUI 600 as shown in FIG. 8 represents the GUI 600 as it may appear to a user assigned to a multi-user virtual sub-space after multiple multi-user virtual sub-spaces have been created. The GUI 600 displays a gallery 802 of user tiles 604 of the users assigned to the multi-user virtual sub-space. In addition to the gallery 802, the GUI 600 displays a representation of other multi-user virtual sub-spaces 804 that have been formed including the multi-user virtual sub-space 806 the users displayed in the user tiles 604 in the reduced gallery 802 are assigned to. In some examples, the representations of the multi-user virtual sub-spaces 804 may include only the multi-user virtual sub-spaces in which the user is assigned, or the representation of the multi-user virtual sub-spaces 804 may include other sub-spaces of the multi-user virtual space. Additionally, a representation of the multi-user virtual space may be displayed to enable a user to quickly switch back to the gallery 602 of all of the user tiles 604.

The GUI 600 focuses media exchanges between the group of users assigned to a multi-user virtual sub-space so that the users are not overwhelmed by activity in other multi-user virtual sub-spaces or the multi-user virtual space. The GUI 600 may focus the media exchanges between the group of users assigned to a multi-user virtual sub-space by limiting a level of perception of media within the multi-user virtual sub-space of media exchanges between users not assigned to the multi-user virtual sub-space. Using audio as an example, the GUI 600 may reduce the volume of media exchanges between users that are not assigned to the multi-user virtual sub-space.

Users assigned to the multi-user virtual sub-space may interact with one another and may utilize the content sharing tools provided by the content sharing tools software without being distracted by activity in the multi-user virtual space or the other multi-user virtual sub-spaces. However, they users assigned to the multi-user virtual sub-spaces may still be able to observe the activity in the other multi-user virtual sub-spaces utilizing the automated summary provided to the GUI 600. Additionally, since the media levels for the other multi-user virtual sub-spaces and the multi-user virtual space are reduced, but still present, a user of the multi-user virtual sub-space may still monitor the activity. The GUI 600 may allow a user to observe media interactions in the multi-user virtual space and the multi-user virtual sub-spaces by hovering over a respective representation of the multi-user virtual space or multi-user virtual sub-space. The virtual space interface software 508 may output media exchanges within the selected multi-user virtual space or multi-user virtual sub-space to the user in response to the user hovering over the selected representation of the multi-user virtual space or multi-user virtual sub-space.

A user of the multi-user virtual space platform may also move between multi-user virtual sub-spaces using the GUI 600 as described. Because the user is able to monitor the other multi-user virtual sub-spaces, they may be able to identify a multi-user virtual sub-space of interest even if they were not initially invited to be assigned to the multi-user virtual sub-spaces. Furthermore, the monitoring tools may alert a user of an activity of interest within a multi-user virtual sub-space so that the user may be prompted to request an assignment to a multi-user virtual sub-space of interest.

Figure 9:
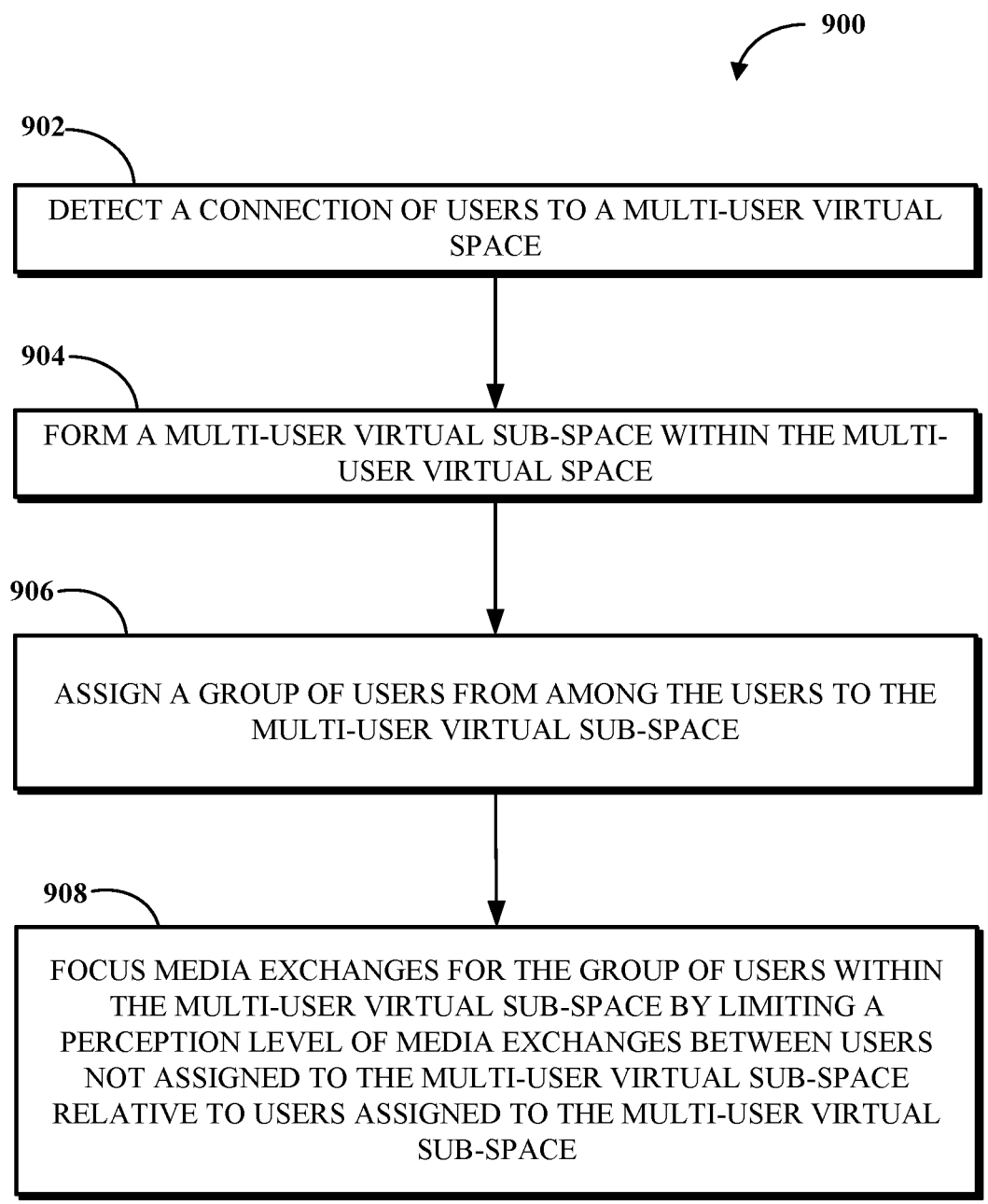
FIG. 9 is a flowchart of an example of a technique for forming multi-user virtual sub-spaces in a multi-user virtual space system.

To further describe some implementations in greater detail, reference is next made to examples of techniques which may be performed by or using the multi-user virtual space system 400. FIG. 9 is a flowchart of an example of a technique 900 for forming multi-user virtual sub-spaces in a multi-user virtual space system 400. The technique 900 can be executed using computing devices, such as the systems, hardware, and software described with respect to FIGS. 1-8. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a connection of users to a multi-user virtual space is detected. The users can be users of the one of the client devices 402A-D of FIG. 5. The multi-user virtual space may be provided by a software platform, such as the multi-user virtual space system 400 of FIG. 4. More specifically, the connection can be a connection from a client device 402 to the server 404 implementing the multi-user virtual space using the multi-user virtual space software 500. The user authentication software 502 may detect the connection of the users to the multi-user virtual space.

At 904, a multi-user virtual sub-space is formed within the multi-user virtual space. That is, the multi-user virtual sub-space orchestration software 504 may form a multi-user virtual sub-space within the multi-user virtual space. Information for displaying the multi-user virtual sub-space to a user may be generated by the virtual space interface software 508.

At 906, a group of users from among the users are assigned to the multi-user virtual sub-space. Although assigning users to the multi-user virtual sub-space is described in the context of FIG. 9 as appearing to be performed after the formation of the multi-user virtual sub-space, the group of users may be assigned to a multi-user virtual sub-space prior to the multi-user virtual sub-space being formed. For example, a group may be identified as sharing common characteristics and assigned to a multi-user virtual sub-space to be formed for the group. Thus, the assignment may occur before the multi-user virtual sub-space is formed by the multi-user virtual sub-space orchestration software 504. The group of users may be assigned to the multi-user virtual sub-space by the multi-user virtual space software 500 as described above.

At 908, media exchanges for the group of users assigned to the multi-user virtual sub-space are focused by limiting a perception level of external media, such as media exchanges between users not assigned to multi-user virtual sub-space relative to internal media, such as media exchanges between users assigned to the multi-user virtual sub-space. That is a perceived media level, such as audio volume of an external audio source, is reduced for users assigned to the multi-user virtual sub-space relative to a perceived media level of an internal audio source for the users assigned to the multi-user virtual sub-space. The reduction of the perceived media level may be performed by the virtual space interface software 508 during generation of the data for presenting the GUI 600. In some instances, external media exchanges may be perceivable by a user assigned to a multi-user virtual sub-space, at a reduced level of perception, for users exchanging media in the multi-user virtual space and for users exchanging media in a different multi-user virtual sub-space. In other instances, external media exchanges may be perceivable by users assigned to a multi-user virtual sub-space, at a reduced level of perception, only for media exchanges occurring within the multi-user virtual space. In other instances, external media exchanges may be perceivable by a user assigned to a multi-user virtual sub-space at a first reduced level of perception for users exchanging media in the multi-user virtual space and at a second reduced level of perception for users exchanging media in a different multi-user virtual sub-space. In some instances, the second reduced level of perception may have a lower level of perception than the first level of perception. For example, a user assigned to a multi-user virtual sub-space may perceive media exchanges between users in the multi-user virtual space at a higher perception level than media exchanges between users assigned to a different multi-user virtual sub-space.

In some implementations, the technique 900 can include reducing a media volume of users not assigned to the multi-user virtual sub-space for the users assigned to the multi-user virtual sub-space. The volume reduction may be performed by the virtual space interface software 508 as described with respect to FIG. 5.

In some implementations, the technique 900 can include instantiating the multi-user virtual space in relation to a scheduled virtual conference meeting. For example, a multi-user virtual space may be instantiated by the multi-user virtual space software 500 for a duration of time before, during, and after a scheduled multi-user virtual space meeting.

In some implementations, the technique 900 can include instantiating the multi-user virtual space independent of a scheduled virtual conference meeting. For example, a multi-user virtual space may be instantiated by the multi-user virtual space software 500 as a stand-alone service without regard to a scheduled virtual conference meeting.

In some implementations, the technique 900 can include forming a second multi-user virtual sub-space within the multi-user virtual space and assigning a user assigned to the multi-user virtual sub-space to the second multi-user virtual sub-space. For example, the multi-user virtual sub-space orchestration software 504 may form a second multi-user virtual sub-space. A user assigned to the multi-user virtual sub-space may send a request to the multi-user virtual sub-space orchestration software 504 to be assigned to the second multi-user virtual sub-space. The multi-user virtual sub-space orchestration software 504 then assigns the user to the second multi-user virtual sub-space. The multi-user virtual sub-space orchestration software 504 may remove the assignment of the user from the multi-user virtual sub-space, or the multi-user virtual sub-space orchestration software 504 may leave the assignment of the user to the multi-user virtual sub-space in place.

In some implementations, the technique 900 can include the multi-user virtual sub-space being formed in response to a user request. For example, a user may interact with the GUI 600 and request that a multi-user virtual sub-space be formed.

In some implementations, the technique 900 can include the multi-user virtual sub-space being formed in response a detection of user interactions among the users. For example, the multi-user virtual sub-space orchestration software 504 may determine that a group of users are interacting with one another and may form a multi-user virtual sub-space for the group of users.

In some implementations, the technique 900 can include monitoring media exchange activity within the multi-user virtual sub-space to determine an activity summary and providing an indication of the activity summary to the multi-user virtual space. For example, the multi-user virtual sub-space orchestration software 504 may monitor interactions in a multi-user virtual sub-space provide summary information to the virtual space interface 508 software for generating information for displaying the summary information in the GUI 600.

In some implementations, the technique 900 can include forming a second multi-user virtual sub-space within the multi-user virtual space and restricting a user of the group of users from being assigned to both the multi-user virtual sub-space and the second multi-user virtual sub-space. For example, the multi-user virtual sub-space orchestration software 504 may form the second multi-user virtual sub-space and restrict a user from being assigned to both the multi-user virtual sub-space and the second multi-user virtual sub-space.

In some implementations, the technique 900 can include forming a second multi-user virtual sub-space within the multi-user virtual space and assigning a user to the second multi-user virtual sub-space while maintaining the assignment of the user to the multi-user virtual sub-space. For example, the multi-user virtual sub-space orchestration software 504 may form the second multi-user virtual sub-space and allow a user to be assigned to both the multi-user virtual sub-space and the second multi-user virtual sub-space.

In some implementations, the technique 900 can include providing content sharing tools to the group of users, wherein the content sharing tools configured to share media between the group of users. For example, the content sharing tool software may provide content sharing tools to the group of users assigned to the multi-user virtual sub-space.

Some implementations may include a method that includes detecting a connection of users to a multi-user virtual space. A multi-user virtual sub-space is formed within the multi-user virtual space. A group of users from among the users is assigned to the multi-user virtual sub-space. Media exchanges for the group of users within the multi-user virtual sub-space are focused by limiting a perception level of media exchanges between users not assigned to multi-user virtual sub-space relative to users assigned to the multi-user virtual sub-space.

In an example, limiting a perception level of media can include reducing a media volume of users not assigned to the multi-user virtual sub-space for the users assigned to the multi-user virtual sub-space. In an example, the method can include instantiating the multi-user virtual space in relation to a scheduled virtual conference meeting. In an example, the method can include instantiating the multi-user virtual space independent of a scheduled virtual conference meeting. In an example, the method can include forming a second multi-user virtual sub-space within the multi-user virtual space and assigning a user assigned to the multi-user virtual sub-space to the second multi-user virtual sub-space in response to a request from the user. In an example, the multi-user virtual sub-space is formed in response to a user request. In an example, the multi-user virtual sub-space is formed in response a detection of user interactions among the users. In an example, the method can include monitoring media exchange activity within the multi-user virtual sub-space to determine an activity summary and providing an indication of the activity summary to the multi-user virtual space. In an example, the method can include forming a second multi-user virtual sub-space within the multi-user virtual space and restricting a user of the group of users from being assigned to both the multi-user virtual sub-space and the second multi-user virtual sub-space. In an example, the method can include forming a second multi-user virtual sub-space within the multi-user virtual space and assigning a user to the second multi-user virtual sub-space while maintaining the assignment of the user to the multi-user virtual sub-space. In an example, the method can include providing content sharing tools to the group of users, the content sharing tools configured to share media between the group of users.

Some implementations may include a device that includes a memory and a processor. The processor can be configured to execute instructions stored in the memory to detect a connection of users to a multi-user virtual space. A multi-user virtual sub-space is formed within the multi-user virtual space. A group of users from among the users is assigned to the multi-user virtual sub-space. Media exchanges for the group of users within the multi-user virtual sub-space are focused by limiting a perception level of media exchanges between users not assigned to multi-user virtual sub-space relative to users assigned to the multi-user virtual sub-space.

In an example, focusing media exchanges for the group of users includes reducing an audio level for a user assigned to the multi-user virtual sub-space for audio generated outside of the multi-user virtual sub-space. In an example, a second multi-user virtual sub-space is formed within the multi-user virtual space and a first user assigned to the multi-user virtual sub-space is invited to the second multi-user virtual sub-space in response to a request from a second user. In an example, the multi-user virtual sub-space is formed in response a detection of user interactions among the group of users.

Some implementations may include a non-transitory computer readable medium that stores instructions operable to cause one or more processors to perform operations that include detecting a connection of users to a multi-user virtual space, forming a multi-user virtual sub-space within the multi-user virtual space, assigning a group of users from among the users to the multi-user virtual sub-space, and focusing media exchanges for the group of users within the multi-user virtual sub-space by limiting a perception level of media exchanges between users not assigned to multi-user virtual sub-space relative to users assigned to the multi-user virtual sub-space.

In an example, limiting a perception level of media includes reducing an audio level of interactions outside of the multi-user virtual sub-space. In an example, the multi-user virtual space is instantiated in coordination with a scheduled virtual conference meeting. In an example, a second multi-user virtual sub-space is formed, and a user assigned to the multi-user virtual sub-space is assigned to the second multi-user virtual sub-space. In an example, activity within the multi-user virtual sub-space is monitored to determine an activity summary and an indication of the activity summary is provided to the multi-user virtual space.

The implementations of this disclosure correspond to methods, non-transitory computer readable media, apparatuses, systems, devices, and the like. In some implementations a method comprises detecting a connection of users to a multi-user virtual space; forming a multi-user virtual sub-space within the multi-user virtual space; assigning a group of users from among the users to the multi-user virtual sub-space; and focusing media exchanges for the group of users within the multi-user virtual sub-space by limiting a perception level of media exchanges between users not assigned to the multi-user virtual sub-space relative to users assigned to the multi-user virtual sub-space. In some implementations, a non-transitory computer readable medium stores instructions operable to cause one or more processors to perform operations comprising detecting a connection of users to a multi-user virtual space; forming a multi-user virtual sub-space within the multi-user virtual space; assigning a group of users from among the users to the multi-user virtual sub-space; and focusing media exchanges for the group of users within the multi-user virtual sub-space by limiting a perception level of media exchanges between users not assigned to the multi-user virtual sub-space relative to users assigned to the multi-user virtual sub-space. In some implementations, an apparatus comprises a memory and a processor configured to execute instructions stored in the memory to detect a connection of users to a multi-user virtual space; form a multi-user virtual sub-space within the multi-user virtual space; assign a group of users from among the users to the multi-user virtual sub-space; and focus media exchanges for the group of users within the multi-user virtual sub-space by limiting a perception level of media exchanges between users not assigned to multi-user virtual sub-space relative to users assigned to the multi-user virtual sub-space.

In some implementations of the method, non-transitory computer readable medium, or apparatus, limiting a perception level of media comprises reducing a media volume of users not assigned to the multi-user virtual sub-space for the users assigned to the multi-user virtual sub-space.

In some implementations of the method, non-transitory computer readable medium, or apparatus, the method comprises, the operations comprise, or the processor is configured to execute the instructions for instantiating the multi-user virtual space in relation to a scheduled virtual conference meeting.

In some implementations of the method, non-transitory computer readable medium, or apparatus, the method comprises, the operations comprise, or the processor is configured to execute the instructions for instantiating the multi-user virtual space independent of a scheduled virtual conference meeting.

In some implementations of the method, non-transitory computer readable medium, or apparatus, the method comprises, the operations comprise, or the processor is configured to execute the instructions for forming a second multi-user virtual sub-space within the multi-user virtual space; and assigning a user assigned to the multi-user virtual sub-space to the second multi-user virtual sub-space in response to a request from the user.

In some implementations of the method, non-transitory computer readable medium, or apparatus, the multi-user virtual sub-space is formed in response to a user request.

In some implementations of the method, non-transitory computer readable medium, or apparatus, the multi-user virtual sub-space is formed in response a detection of user interactions among the users.

In some implementations of the method, non-transitory computer readable medium, or apparatus, the method comprises, the operations comprise, or the processor is configured to execute the instructions for monitoring media exchange activity within the multi-user virtual sub-space to determine an activity summary; and providing an indication of the activity summary to the multi-user virtual space.

In some implementations of the method, non-transitory computer readable medium, or apparatus, the method comprises, the operations comprise, or the processor is configured to execute the instructions for forming a second multi-user virtual sub-space within the multi-user virtual space; and restricting a user of the group of users from being assigned to both the multi-user virtual sub-space and the second multi-user virtual sub-space.

In some implementations of the method, non-transitory computer readable medium, or apparatus, the method comprises, the operations comprise, or the processor is configured to execute the instructions for forming a second multi-user virtual sub-space within the multi-user virtual space; and assigning a user to the second multi-user virtual sub-space while maintaining the assignment of the user to the multi-user virtual sub-space.

In some implementations of the method, non-transitory computer readable medium, or apparatus, the method comprises, the operations comprise, or the processor is configured to execute the instructions for providing content sharing tools to the group of users, the content sharing tools configured to share media between the group of users.

In some implementations of the method, non-transitory computer readable medium, or apparatus, focusing media exchanges for the group of users comprises reducing an audio level for a user assigned to the multi-user virtual sub-space for audio generated outside of the multi-user virtual sub-space.

In some implementations of the method, non-transitory computer readable medium, or apparatus, the method comprises, the operations comprise, or the processor is configured to execute the instructions for forming a second multi-user virtual sub-space within the multi-user virtual space; and inviting a first user assigned to the multi-user virtual sub-space to the second multi-user virtual sub-space in response to a request from a second user.

In some implementations of the method, non-transitory computer readable medium, or apparatus, the multi-user virtual sub-space is formed in response a detection of user interactions among the group of users.

In some implementations of the method, non-transitory computer readable medium, or apparatus, limiting a perception level of media comprises reducing an audio level of interactions outside of the multi-user virtual sub-space.

In some implementations of the method, non-transitory computer readable medium, or apparatus, the method comprises, the operations comprise, or the processor is configured to execute the instructions for instantiating the multi-user virtual space in coordination with a scheduled virtual conference meeting.

In some implementations of the method, non-transitory computer readable medium, or apparatus, the method comprises, the operations comprise, or the processor is configured to execute the instructions for forming a second multi-user virtual sub-space; and assigning a user assigned to the multi-user virtual sub-space to the second multi-user virtual sub-space.

In some implementations of the method, non-transitory computer readable medium, or apparatus, the method comprises, the operations comprise, or the processor is configured to execute the instructions for monitoring activity within the multi-user virtual sub-space to determine an activity summary; and providing an indication of the activity summary to the multi-user virtual space.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    implementing, by a server comprising multi-user virtual space software, a multi-user virtual space, wherein implementing the multi-user virtual space comprises transmitting first video data and first audio data between a plurality of devices assigned to the multi-user virtual space, each of the plurality of devices being associated with a respective user thereof of a plurality of users;
    forming a multi-user virtual sub-space within the multi-user virtual space;
    assigning a group of users from among the plurality of users to the multi-user virtual sub-space, the group of users corresponding to a group of devices of the plurality of devices;
    implementing, by the server, the multi-user virtual sub-space by transmitting second video data and second audio data between the plurality of devices;
    focusing media exchanges for the group of users within the multi-user virtual sub-space by limiting a perception level of media exchanges between users not assigned to the multi-user virtual sub-space relative to users assigned to the multi-user virtual sub-space, wherein limiting the perception level comprises reducing a media volume of users not assigned to the multi-user virtual sub-space for the users assigned to the multi-user virtual sub-space;
    receiving, from a user not assigned to the multi-user virtual sub-space, a request to notify the user not assigned to the multi-user virtual sub-space if a subject is discussed by the users assigned to the multi-user virtual sub-space;
    notifying the user not assigned to the multi-user virtual sub-space based on the subject being discussed by the users assigned to the multi-user virtual sub-space;
    receiving, from a user assigned to the multi-user virtual sub-space, a user input associated with an additional multi-user virtual sub-space, wherein the user assigned to the multi-user virtual sub-space is not assigned to the additional multi-user virtual sub-space; and
    reducing, based on the user input, a perception level of media exchanges associated with the multi-user virtual sub-space, relative to a perception level of media exchanges associated with the additional multi-user virtual sub-space, for the user assigned to the multi-user virtual sub-space.

2. The method of claim 1,
    wherein reducing the perception level of the media exchanges associated with the multi-user virtual sub-space, relative to a perception level of media exchanges associated with the additional multi-user virtual sub-space comprises:
    reducing an audio volume of the media exchanges associated with the multi-user virtual sub-space, relative to an audio volume of media exchanges associated with the additional multi-user virtual sub-space.

3. The method of claim 1, further comprising:
    instantiating the multi-user virtual space in relation to a scheduled virtual conference meeting.

4. The method of claim 1, further comprising:
    instantiating the multi-user virtual space independent of a scheduled virtual conference meeting.

5. The method of claim 1, further comprising:
    forming a second multi-user virtual sub-space within the multi-user virtual space; and
    assigning a user assigned to the multi-user virtual sub-space to the second multi-user virtual sub-space in response to a request from the user.

6. The method of claim 1, wherein the multi-user virtual sub-space is formed in response to a user request.

7. The method of claim 1, wherein the multi-user virtual sub-space is formed in response a detection of user interactions among the users.

8. The method of claim 1, further comprising:
    monitoring media exchange activity within the multi-user virtual sub-space to determine an activity summary; and
    providing an indication of the activity summary to the multi-user virtual space.

9. The method of claim 1, further comprising:
    forming a second multi-user virtual sub-space within the multi-user virtual space; and
    restricting a user of the group of users from being assigned to both the multi-user virtual sub-space and the second multi-user virtual sub-space.

10. The method of claim 1, further comprising:
forming a second multi-user virtual sub-space within the multi-user virtual space; and
assigning a user to the second multi-user virtual sub-space while maintaining the assignment of the user to the multi-user virtual sub-space.

11. The method of claim 1, further comprising:
providing content sharing tools to the group of users, the content sharing tools configured to share media between the group of users.

12. An apparatus, comprising:
a memory; and
a processor, the processor configured to execute instructions stored in the memory to:
implement, by a server comprising multi-user virtual space software, a multi-user virtual space, wherein implementing the multi-user virtual space comprises transmitting first video data and first audio data between a plurality of devices assigned to the multi-user virtual space, each of the plurality of devices being associated with a respective user thereof of a plurality of users;
form a multi-user virtual sub-space within the multi-user virtual space;
assign a group of users from among the plurality of users to the multi-user virtual sub-space, the group of users corresponding to a group of devices of the plurality of devices;
implement, by the server, the multi-user virtual sub-space by transmitting second video data and second audio data between the plurality of devices;
focus media exchanges for the group of users within the multi-user virtual sub-space by limiting a perception level of media exchanges between users not assigned to multi-user virtual sub-space relative to users assigned to the multi-user virtual sub-space, wherein limiting the perception level comprises reducing a media volume of users not assigned to the multi-user virtual sub-space for the users assigned to the multi-user virtual sub-space;
receive, from a user not assigned to the multi-user virtual sub-space, a request to notify the user not assigned to the multi-user virtual sub-space if a subject is discussed by the users assigned to the multi-user virtual sub-space;
notify the user not assigned to the multi-user virtual sub-space based on the subject being discussed by the users assigned to the multi-user virtual sub-space;
receive, from a user assigned to the multi-user virtual sub-space, a user input associated with an additional multi-user virtual sub-space, wherein the user assigned to the multi-user virtual sub-space is not assigned to the additional multi-user virtual sub-space; and
reduce, based on the user input, a perception level of media exchanges associated with the multi-user virtual sub-space, relative to a perception level of media exchanges associated with the additional multi-user virtual sub-space, for the user assigned to the multi-user virtual sub-space.

13. The apparatus of claim 12, wherein, to reduce the perception level of the media exchanges associated with the multi-user virtual sub-space, relative to a perception level of media exchanges associated with the additional multi-user virtual sub-space, the processor is configured to execute the instructions to:
reduce an audio volume of the media exchanges associated with the multi-user virtual sub-space, relative to an audio volume of media exchanges associated with the additional multi-user virtual sub-space.

14. The apparatus of claim 12, wherein the processor is further configured to execute instructions stored in the memory to:
form a second multi-user virtual sub-space within the multi-user virtual space; and
invite a first user assigned to the multi-user virtual sub-space to the second multi-user virtual sub-space in response to a request from a second user.

15. The apparatus of claim 12, wherein:
the multi-user virtual sub-space is formed in response a detection of user interactions among the group of users.

16. A non-transitory computer readable medium that stores instructions operable to cause one or more processors to perform operations comprising:
implementing, by a server comprising multi-user virtual space software, a multi-user virtual space, wherein implementing the multi-user virtual space comprises transmitting first video data and first audio data between a plurality of devices assigned to the multi-user virtual space, each of the plurality of devices being associated with a respective user thereof of a plurality of users;
forming a multi-user virtual sub-space within the multi-user virtual space;
assigning a group of users from among the plurality of users to the multi-user virtual sub-space, the group of users corresponding to a group of devices of the plurality of devices;
implementing, by the server, the multi-user virtual sub-space by transmitting second video data and second audio data between the plurality of devices;
focusing media exchanges for the group of users within the multi-user virtual sub-space by limiting a perception level of media exchanges between users not assigned to multi-user virtual sub-space relative to users assigned to the multi-user virtual sub-space, wherein limiting the perception level comprises reducing a media volume of users not assigned to the multi-user virtual sub-space for the users assigned to the multi-user virtual sub-space;
receiving, from a user not assigned to the multi-user virtual sub-space, a request to notify the user not assigned to the multi-user virtual sub-space if a subject is discussed by the users assigned to the multi-user virtual sub-space;
notifying the user not assigned to the multi-user virtual sub-space based on the subject being discussed by the users assigned to the multi-user virtual sub-space;
receiving, from a user assigned to the multi-user virtual sub-space, a user input associated with an additional multi-user virtual sub-space, wherein the user assigned to the multi-user virtual sub-space is not assigned to the additional multi-user virtual sub-space; and
reducing, based on the user input, a perception level of media exchanges associated with the multi-user virtual sub-space, relative to a perception level of media exchanges associated with the additional multi-user virtual sub-space, for the user assigned to the multi-user virtual sub-space.

17. The non-transitory computer readable medium of claim 16, wherein reducing the perception level of the media exchanges associated with the multi-user virtual sub-space, relative to a perception level of media exchanges associated with the additional multi-user virtual sub-space comprises:

reducing an audio volume of the media exchanges associated with the multi-user virtual sub-space, relative to an audio volume of media exchanges associated with the additional multi-user virtual sub-space.

18. The non-transitory computer readable medium of claim 16, the operations further comprising:
instantiating the multi-user virtual space in coordination with a scheduled virtual conference meeting.

19. The non-transitory computer readable medium of claim 16, the operations further comprising:
forming a second multi-user virtual sub-space; and
assigning a user assigned to the multi-user virtual sub-space to the second multi-user virtual sub-space.

20. The non-transitory computer readable medium of claim 16, the operations further comprising:
monitoring activity within the multi-user virtual sub-space to determine an activity summary; and
providing an indication of the activity summary to the multi-user virtual space.

* * * * *